(12) United States Patent
Stretton

(10) Patent No.: US 11,945,595 B2
(45) Date of Patent: Apr. 2, 2024

(54) SUPPORT STRUCTURE FOR ATTACHING A GAS TURBINE ENGINE TO AN AIRCRAFT PYLON

(71) Applicant: ROLLS-ROYCE plc, London (GB)

(72) Inventor: Richard G Stretton, Derby (GB)

(73) Assignee: ROLLS-ROYCE PLC, London (GB)

( * ) Notice: Subject to any disclaimer, the term of this patent is extended or adjusted under 35 U.S.C. 154(b) by 3 days.

(21) Appl. No.: 18/074,270

(22) Filed: Dec. 2, 2022

(65) Prior Publication Data

US 2023/0182912 A1 Jun. 15, 2023

(30) Foreign Application Priority Data

Dec. 9, 2021 (GB) ...................................... 2117778

(51) Int. Cl.
*B64D 27/40* (2024.01)
*B64D 27/10* (2006.01)
*F02C 7/20* (2006.01)

(52) U.S. Cl.
CPC ............ *B64D 27/40* (2024.01); *B64D 27/10* (2013.01); *B64D 27/402* (2024.01); *F02C 7/20* (2013.01); *B64D 27/406* (2024.01)

(58) Field of Classification Search
CPC .... B64D 27/40; B64D 27/402; B64D 27/404; B64D 27/406
See application file for complete search history.

(56) References Cited

U.S. PATENT DOCUMENTS

| 4,603,821 A * | 8/1986 | White ................... B64D 27/40 60/797 |
| 4,725,019 A * | 2/1988 | White ................... B64D 27/40 244/54 |
| 6,474,597 B1 * | 11/2002 | Cazenave ............. B64D 27/18 244/54 |
| 9,919,804 B2 | 3/2018 | Pautis et al. |
| 10,246,196 B2 | 4/2019 | Pautis et al. |

(Continued)

FOREIGN PATENT DOCUMENTS

| FR | 3079212 A1 | 9/2019 | |
| IT | 1058337 B * | 4/1982 | ............. B64D 27/18 |

OTHER PUBLICATIONS

Apr. 17, 2023 extended Search Report issued in European Patent Application No. 22206291.1.

*Primary Examiner* — Todd E Manahan
*Assistant Examiner* — Marc J Amar
(74) *Attorney, Agent, or Firm* — Oliff PLC

(57) ABSTRACT

A support structure for attaching an engine to an aircraft pylon at front, mid and rear attachment positions thereof, including a front mount joined to the engine and configured to attach to the pylon at the front attachment position and a rear mount joined to a core casing to attach to the pylon at the rear attachment position, each of the front and rear mounts configured to transfer lateral and vertical loads from the engine to the pylon, and the rear mount being spaced from the front mount such that yaw and pitch torques are transferred from the engine to the pylon through the front and rear mounts. The support structure also includes an axial load transfer formation to transfer axial loads from the engine to the pylon and a roll-torque transfer formation to transfer roll torque from the core casing to the pylon.

20 Claims, 8 Drawing Sheets

(56) References Cited

U.S. PATENT DOCUMENTS

| | | | |
|---|---|---|---|
| 2005/0274485 A1* | 12/2005 | Huggins | B22C 9/22 |
| | | | 164/349 |
| 2008/0073460 A1* | 3/2008 | Beardsley | F02K 3/06 |
| | | | 244/54 |
| 2013/0240666 A1* | 9/2013 | Schnelz | B64D 27/40 |
| | | | 244/54 |
| 2014/0366555 A1* | 12/2014 | Beier | B64D 27/40 |
| | | | 60/796 |
| 2016/0221682 A1* | 8/2016 | Pautis | B64D 27/18 |
| 2017/0057652 A1* | 3/2017 | Journade | F02C 7/20 |
| 2017/0096229 A1* | 4/2017 | Pautis | B64D 27/40 |
| 2019/0283890 A1* | 9/2019 | Pautis | B64D 27/40 |
| 2020/0207481 A1 | 7/2020 | Combes et al. | |
| 2021/0300577 A1 | 9/2021 | Coleman et al. | |
| 2022/0055757 A1* | 2/2022 | Shinde | B64D 27/40 |

* cited by examiner

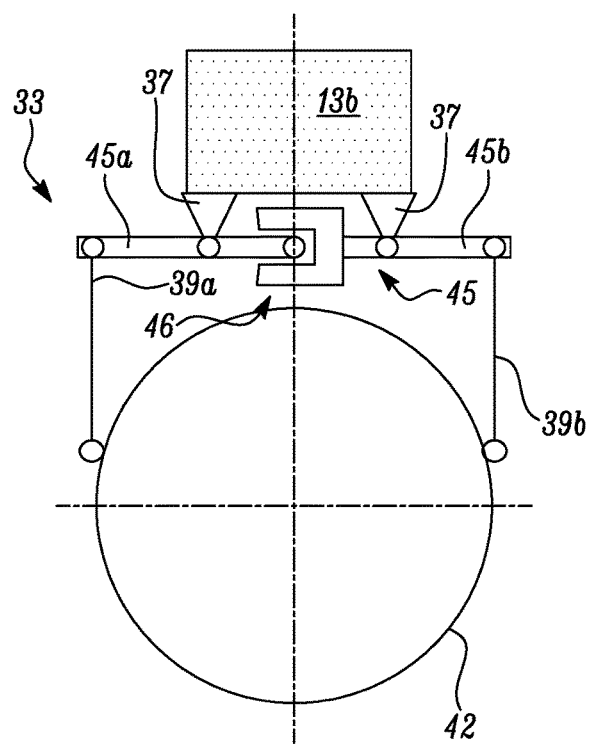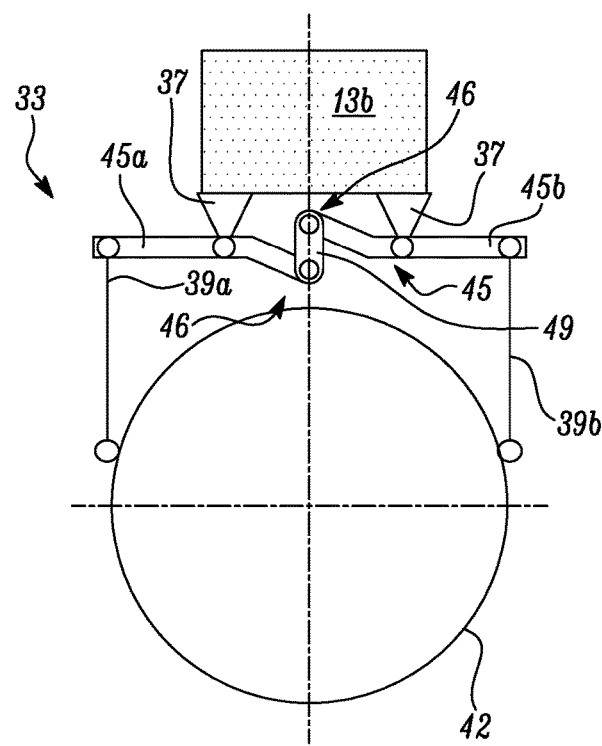
*FIG. 5A*  *FIG. 5B*

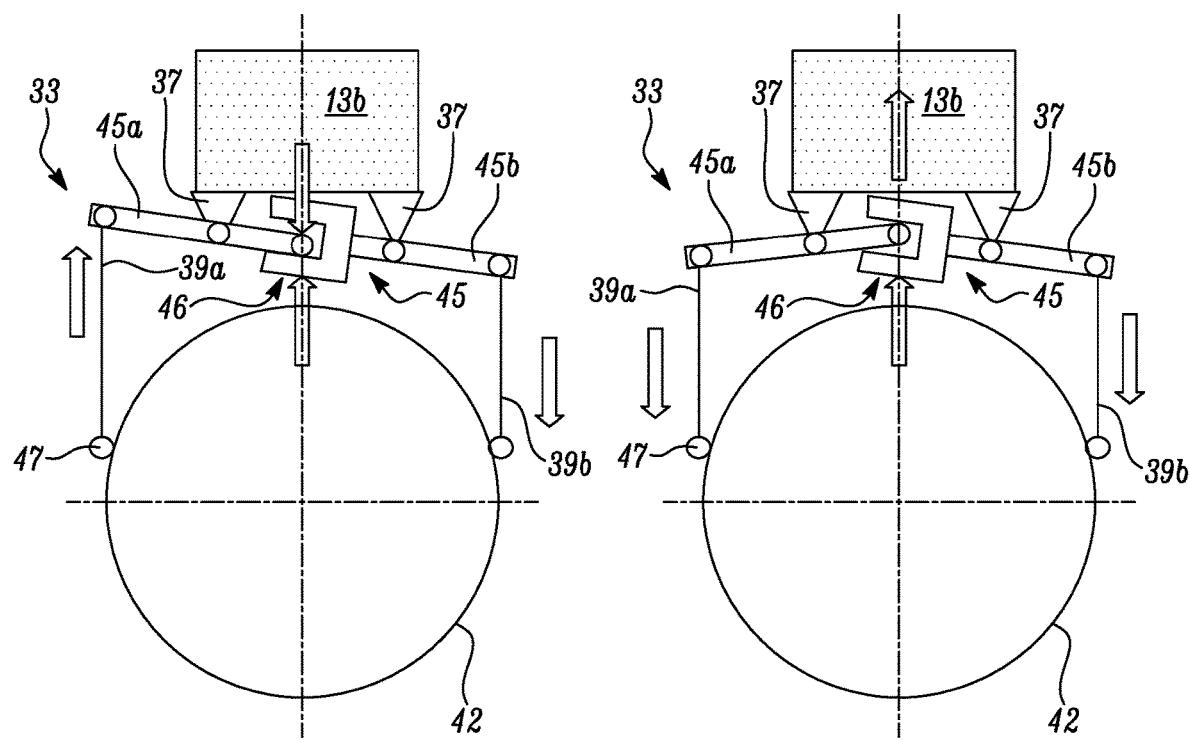
*FIG. 6A*  *FIG. 6B*

SUPPORT STRUCTURE FOR ATTACHING A GAS TURBINE ENGINE TO AN AIRCRAFT PYLON

CROSS-REFERENCE TO RELATED APPLICATIONS

This specification claims priority pursuant to 35 U.S.C. 119(a) to U.K. Patent Application No. 2117778.7, filed Dec. 9, 2021, which application is incorporated herein by reference in its entirety.

BACKGROUND

Field of the Disclosure

The present invention relates to a support structure for attaching a gas turbine engine to an aircraft pylon.

Description of the Related Art

Support structures for attaching an engine to an aircraft pylon conventionally include a front mount and a rear mount (as shown in for example US 2020/0207481 and FR 3 079 212-A1). These are configured to transfer loads and torques from the engine core to the aircraft pylon. It is known that by moving the front mount as far forwards as possible to increase the separation to the rear mount, the ability to react pitch and yaw moments is improved, reducing mount loads and core casing distortions, and thereby improving core tip clearances and the engine performance. However, moving a conventional front core mount forward, for example, at or close to the base of fan outlet guide vanes (hereinafter FOGVs), results in the pylon being extended forwards and thus requires an extended upper bifurcation in the bypass duct, or a local blister fairing to cover the front mount, both producing an aero-performance penalty which can be particularly severe in an exhaust system with a high bypass ratio and a low pressure ratio. Thus, it is desirable to provide an alternative support structure which can avoid such an aero-performance penalty.

Furthermore, it is desirable to reduce the profiles of the front and rear mounts to reduce the size of, or even avoid the need for, fairings used to shield them from airflows. However, reducing these profiles, while still transferring the same amounts of loads and torques through the mounts, exposes them to an increased risk of being unable to support the resulting loads and to transfer roll torque from the engine to the pylon.

It is also known to have a front section of the pylon which has an open-lattice structure to facilitate engine-to-pylon systems routing. It can be problematic, however, to provide an open-lattice structure that is both compact and capable of reacting roll torque. In this case, the roll torque would traditionally be reacted via the rear mount, resulting in a wide rear mount and a significant aerodynamic penalty.

The present invention has been devised in light of the above considerations.

SUMMARY

In a first aspect, the present invention provides a gas turbine engine including a support structure for attaching the engine to an aircraft pylon at front, mid and rear attachment positions thereof;

wherein the engine further includes:
an engine core comprising a turbine, a compressor, and a core shaft connecting the turbine to the compressor; and
a core casing surrounding the engine core; and
wherein the support structure includes:
a front mount joined to the engine and configured to attach to the pylon at the front attachment position and a rear mount joined to the core casing and configured to attach to the pylon at the rear attachment position, each of the front and rear mounts being configured to transfer lateral and vertical loads from the engine to the pylon, and the rear mount being spaced from the front mount such that yaw and pitch torques are also transferred from the engine to the pylon through the front and rear mounts;
an axial load transfer formation configured to transfer axial loads from the engine to the pylon; and
a roll-torque transfer formation joined to opposite lateral sides of the core casing and configured to attach to the pylon at the mid attachment position to transfer roll torque from the core casing to the pylon.

Advantageously, since the majority of the axial loads and the roll torques can be respectively reacted by the axial load transfer formation and the roll-torque transfer formation, the mechanical burden on the front and rear mounts can be decreased and their respective profiles (both vertical and lateral) can be reduced without compromising their structural stability. The reduced profile can also allow the front mount to be brought forward, e.g. to the ends of FOGVs. These form a relatively stiff structure, and therefore connecting the front mount at or close to their ends can enhance stability and reduce core casing distortions. Also, a more forward position of the front mount increases the separation distance between the front and rear mounts, improving the ability of these mounts to react yaw and pitch torques.

In addition, a reduced profile for the front mount allows it to be installed without requiring an extended upper bifurcation in a fan bypass duct or a local blister fairing to cover it. In this way, aerolines and the overall aerodynamic performance of the engine can be improved. The rear mount, also having a reduced profile, can be installed without a blister fairing and the size of a downstream pylon fairing can be reduced, thereby also improving the aerodynamic performance of the aircraft. Also a reduced vertical height for the rear mount can provide more space for pylon or engine structures.

In a second aspect, the present invention provides an aircraft having one or more gas turbine engines including respective support structures according to the first aspect, the one or more gas turbine engines being attached to respective pylons of the aircraft by the support structures.

The or each pylon of the aircraft may have a boxed section to transfer roll torque extending between at least the mid attachment position and the rear attachment position, and a front section having an open-lattice structure extending from the front attachment position to the boxed section. Advantageously, the roll-torque transfer formation focuses the reaction of roll torques to a section of the pylon extending downstream from the mid attachment position. This allows the front section of the pylon to have the open-lattice structure without compromising its structural stability, the open structure in turn facilitating engine-to-pylon systems routing therethrough.

Optional features of the invention will now be set out. These are applicable singly or in any combination with any aspect of the invention.

The roll-torque transfer formation may have a first torque link pivotally joined at a lower end thereof to one side of the core casing, a second torque link pivotally joined at a lower end thereof to the other side of the core casing, and a torque beam which extends across the top of the core casing and which is pivotally joined at opposite ends of the beam to respective upper ends of the first and second torque links. The roll-torque transfer formation may further have a support bracket which is configured to attach to the pylon at the mid attachment position, the support bracket pivotally connecting to the torque beam at two laterally spaced apart support positions between the opposite ends of the beam. The torque beam may have a central portion between the support positions forming a hinge joint such that an upward vertical load transmitted through one of the torque links and a simultaneous downward vertical load transmitted through the other torque link are reacted at the support positions to transfer roll torque from the core casing to the pylon, whereas simultaneous movement of both torque links in the same vertical direction hinges the hinge joint to substantially prevent vertical loads being reacted at the support positions.

The axial position of the roll-torque transfer formation can be selected to realise a number of benefits. For example, it can be chosen to fit within the aerolines with little or no aerodynamic penalty. As another example, it may be positioned to diffuse loads into the core engine casing and/or pylon structure to reduce local deflections and distortion, thereby reducing engine carcase deflections and improving tip clearance control and engine performance.

The torque beam of the roll-torque transfer formation may have a first half which provides the pivotal joint to the first torque link and the pivotal connection to the support bracket at one of the support positions, and a second half which provides the pivotal joint to the second torque link and the pivotal connection to the support bracket at the other support position. The first half of the torque beam may then have a male portion that is received in a corresponding female portion of second half of the torque beam to form the hinge joint. This can improve the vertical compactness of the hinge joint, which is particularly advantageous if space under the pylon at the mid attachment position is constrained.

According to another option, however, the first half of the torque beam and the second half of the torque beam may be pivotally connected to respective ends of a central link to form the hinge joint. Advantageously, this type of hinge joint can reduce wear and/or fretting at the joint, and reduce any backlash or play in the system.

The engine may further include a propulsive fan located upstream of the engine core, a bypass duct arranged radially outwardly of the engine core to contain a bypass airflow generated by the fan, and a circumferential row of outlet guide vanes extending across the bypass duct behind the fan. The front mount may then be joined to the core casing at or behind the outlet guide vanes. This is advantageous as the outlet guide vanes form a relatively stiff structure and therefore connecting the front mount at this position provides additional stability and reduces core casing distortions. Another option, however, is for the front mount to be joined the engine at a radially outer end of one or more of the outlet guide vanes.

The front mount of the support structure may be configured so as to substantially prevent roll torque being reacted into the pylon thereat. For example, the front mount may connect the engine to the aircraft pylon via a monoball connection. This can be an axially extending trunnion to react lateral and vertical loads, with a spherical ball joint connection to the core engine casing to isolate any pitch or yaw misalignment. The axial trunnion can facilitate engine installation or removal by an axial translation. The monoball connection can thus provide a compact structure, both vertically and laterally, which can reduce the aerodynamic impact near the FOGV exit and can facilitate systems installation at the front of the engine core where the environment is advantageously cooler. In another example, however, the front mount of the support structure may have a twin link arrangement to connect the engine to the aircraft pylon. In particular, twin links can extend from opposite sides of a swing centre attached to the pylon, and thus substantially prevent roll torque being reacted into pylon. Each link of the twin links can attach tangentially to the engine to further reduce core casing distortions.

The axial load transfer formation may include the front mount, which is configured to transfer axial loads from the engine to the pylon. Alternatively or additionally, the axial load transfer formation may include a pair of thrust links positioned on opposite lateral sides of the engine core, each thrust link having a first end which joins to a respective lateral side of the core casing and each thrust link extending rearwardly, upwardly and inwardly from its first end to a second end which is configured to join to the pylon at a further mid attachment position thereof to transfer axial loads from the engine to the pylon. Advantageously, this can reduce the mechanical burden on the front mount and its compactness can be further improved. Optionally, the thrust links may be configured to join to the pylon via a balance device, such as a balance beam or whippletree arrangement, configured to balance thrust loads in each thrust link.

When the axial load transfer formation includes the pair of thrust links, the further mid attachment position of the pylon for the thrust links may coincide with, or be in front of, the mid attachment position of the pylon for the roll-torque transfer formation. With such an arrangement, the thrust links can be made lighter and more compact and at the same time, the roll torque transfer formation can be joined to the pylon at a point closer to a wing reaction point of the aircraft, producing less torque wind up in the pylon.

The engine may further include a circumferential heat exchange unit surrounding the engine core. In this case, the front mount may be joined to the core casing with the front mount conveniently located underneath the heat exchange unit of the engine, further improving the aerodynamic performance of the engine. More generally, the front mount is compatible with increased systems installation at the front of the engine core, where the environment is advantageously cooler.

As noted elsewhere herein, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments illustrating the principles of the invention will now be discussed with reference to the accompanying figures in which:

FIGS. 5A and 5B are respective schematic front views of two variants of a roll-torque transfer formation of the support structure;

FIGS. 6A and 6B are schematic front views of the roll-torque transfer formation of FIG. 5A in reaction to respectively an axial torque and vertical core casing movement;

DETAILED DESCRIPTION OF THE DISCLOSURE

Aspects and embodiments of the present invention will now be discussed with reference to the accompanying figures. Further aspects and embodiments will be apparent to those skilled in the art. All documents mentioned in this text are incorporated herein by reference.

Figure 1:
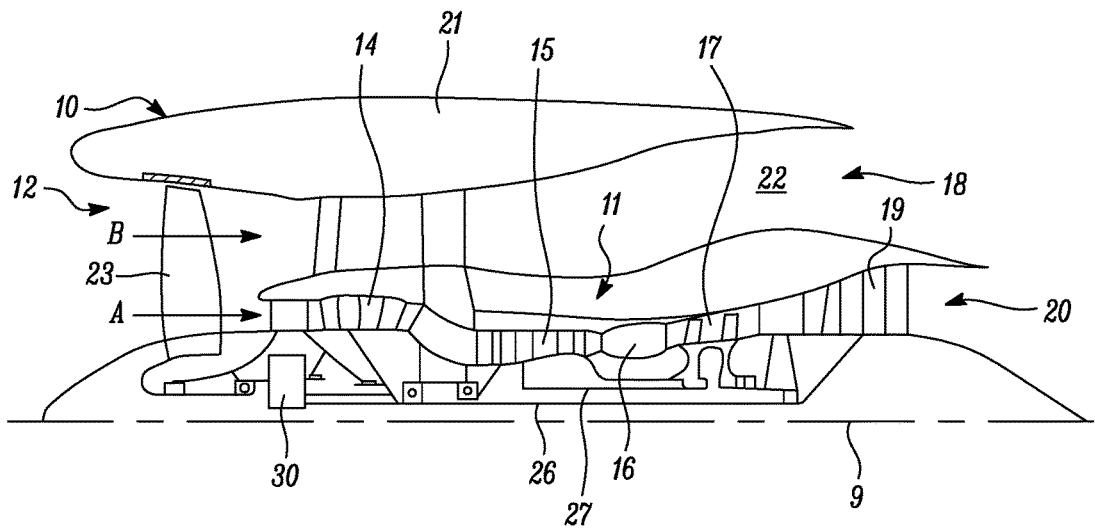
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
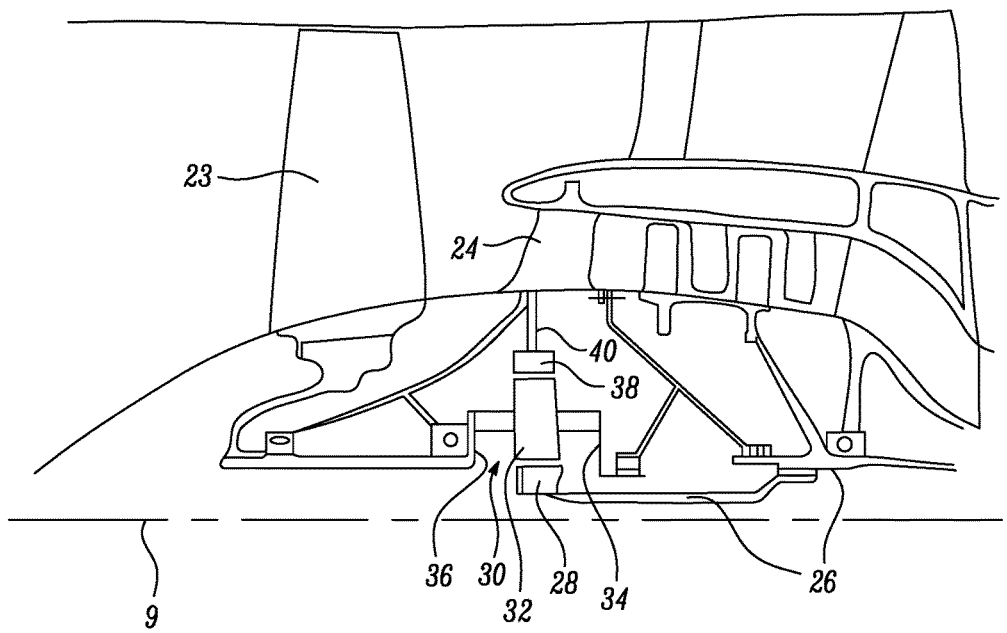
FIG. 2 is a close-up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
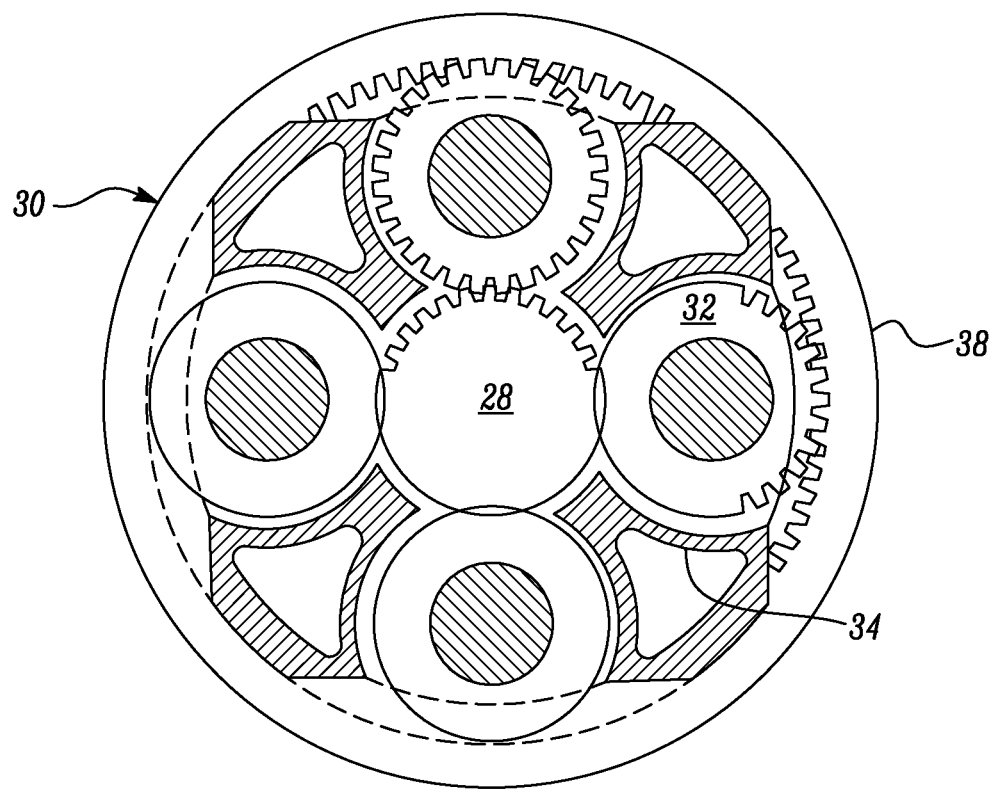
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
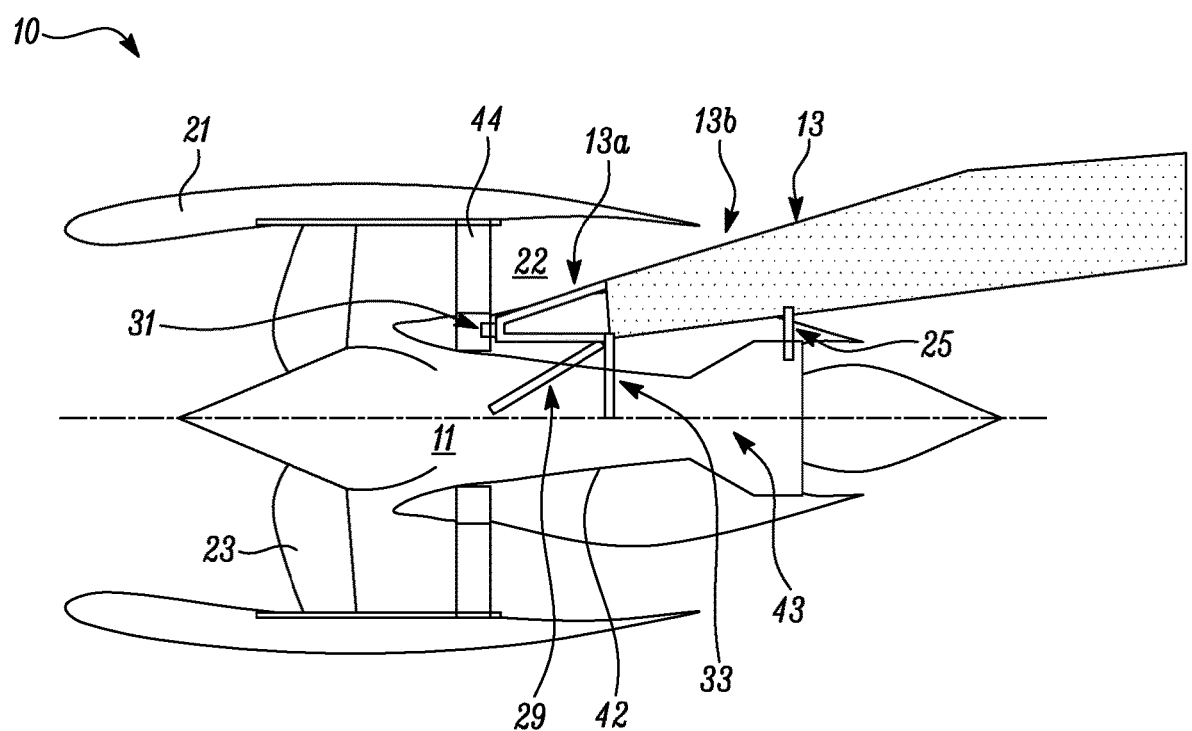
FIG. 4 is a schematic side view of a gas turbine engine including a support structure for attaching the engine to a pylon.

FIG. 4 is a schematic side view of a similar gas turbine engine 10. Equivalent features in FIG. 4 and FIGS. 1 to 3 have the same reference numbers. Thus, the gas turbine engine 10 shown in FIG. 4 has a nacelle 21, a bypass duct 22, a fan 23, FOGVs 44, an engine core 11, and a core casing 42. Also shown, however, is a support structure 43 which attaches the engine 10 to an aircraft pylon 13.

The support structure 43 has a front mount 31 attaching the core casing 42 to a front attachment position of the pylon and a pair of thrust links 29 attaching the core casing 42 to a mid attachment position at a lower connection face of the pylon 13. The thrust links 29 are connected to the core casing 42 with the individual thrust links positioned on opposite lateral sides of the engine core 11. The thrust links 29 extend rearwardly, upwardly and inwardly from respective first ends at the core casing 42 to respective second ends at the mid attachment position of the pylon. Optionally, the thrust links 29 may be joined to the lower connection face of pylon 13 via a balance beam or a whippletree arrangement. This can balance the thrust loads in the thrust links and substantially prevent yaw torques being reacted by the links.

The support structure 43 also has a roll-torque transfer formation 33 attaching the core casing 42 to the mid attachment position of the pylon 13, and a rear mount 25 attaching the core casing 42 to a rear attachment position at the lower connection face of the pylon 13. This structure has to transmit axial, vertical and lateral loads, as well as roll, yaw and pitch torques from the engine to the pylon.

During operation, the thrust links 29 transfer the axial loads from the engine 10 to the pylon 13, and each of the front 31 and rear 25 mounts transfers the lateral and vertical loads from the core casing 42 to the pylon 13. Furthermore, due to the substantial distance between the front and rear mounts, they also effectively transfer the yaw and pitch torques from the engine 10 to the pylon 13 via the front 31 and rear 25 mounts. The roll-torque transfer member 33 then transfers the roll torques from the engine 10 to the pylon 13.

The aircraft pylon 13 has a front section 13a having an open-lattice structure extending from the front attachment position to the mid attachment position and a boxed section 13b extending from the mid attachment position to the rear attachment position and then onwards to the connection of the pylon with the rest of the aircraft. The front section 13a is able to adopt the open-lattice structure, which facilitates engine-to-pylon systems routing, as it is not exposed to roll torques. By contrast, the boxed section 13b, which extends from the mid position rearwards, allows the pylon to transfer roll torques received via the roll-torque transfer member 33 to the wider aircraft structure.

Advantageously, the profiles of the front 31 and rear mounts 25 can be reduced without compromising their structural stability, as the majority of the axial loads and the roll torques are reacted respectively by the thrust links 29 and the roll-torque transfer formation 33, and thus the mechanical burden on the front 31 and rear 25 mounts is reduced. Facilitated by this, the front mount 31 can be brought forward to the base of FOGVs 44. These form a relatively stiff structure, and therefore connecting the front mount 31 at their base enhances stability and reduces core casing distortions. Additionally, the reaction of yaw and pitch torques by the front 31 and rear 25 mounts is improved due to the increased spacing between them.

Conveniently, the front mount 31, having a reduced profile, can fit underneath a circumferential heat exchange unit (not shown) surrounding the engine core 11. Moreover, the front mount 31 can be installed without requiring an extended upper bifurcation in the bypass duct 22 or a local blister fairing to cover it. This reduces the impact on fan bypass duct aerolines and improves the aerodynamic performance of the engine 10. The rear mount 25, also having a reduced profile, can likewise be installed without a blister fairing.

The front mount 31 may be joined to the to the core casing 42 via a monoball connection (not shown). The monoball connection can be formed by an axially extending trunnion to react lateral and vertical loads, with a spherical ball joint connection to the core casing to substantially isolate pitch or yaw misalignment. This facilitates the engine 10 installation and removal by axial translation. The monoball connection provides a compact forward structure, both vertically and laterally, which reduces the aerodynamic impact near the FOGV 44 exit and facilitates systems installation at the front of the engine core 11 where the environment is advantageously cooler.

FIGS. 5A and 5B schematically show two variants of the roll-torque transfer formation 33 from the front. Both variants have a first 39a and a second 39b torque link, the links having respective lower ends pivotally joined to opposite lateral sides of the core casing 42 and respective upper ends pivotally joined to opposite ends of a torque beam 45. This beam extends across the top of the core casing 42 and is pivotally joined to a support bracket 37 at two laterally spaced support positions between the two ends of the beam. The support bracket 37 is in turn attached to the lower connection face of the pylon 13 at the mid attachment position. The pivotal joints can be spherical connections, allowing pivotal movement not only in the plane of the drawings (perpendicular to the engine axis), but also to some degree out of this plane. Such joints help the formation to absorb core casing movements which do not generate roll torque, including core casing thermal expansions. The length of the torque links 39a, 39b also allows them to absorb lateral and axial core casing movements due to thermal, mechanical or build/manufacturing tolerances by rotation of the pivotal joints.

Optionally, one or both torque links can be length adjustable for initial rigging onto the engine.

Between the support positions, a central portion of the beam forms a hinge joint 46. In the variant of FIG. 5A, the torque beam 45 has a first half 45a having a male portion and a second half 45b having a female portion that receives the male portion of the first half 45a to form the hinge joint 46. This type of hinge joint 46 is relatively compact, which is advantageous when the available space under the lower connection face of the pylon 13 is limited. In the variant of FIG. 5B, the torque beam 45 has a first half 45a and a second half 45b which are pivotally connected to respective ends of a central link 49 to form the hinge joint 46. Advantageously, this type of hinge joint 46 can reduce wear and/or fretting at the joint and reduce any backlash/play in the system.

During operation, an upward vertical load transmitted through one of the torque links 39a, 39b and a simultaneous downward vertical load transmitted through the other torque link 39a, 39b are reacted at the support positions to transfer roll torque from the core casing 42 to the boxed section 13b of the pylon 13. In contrast, simultaneous movement of both torque links 39a, 39b in the same vertical direction due to vertical movement of the core casing 42 hinges the hinge joint 46 to substantially prevent vertical loads being reacted at the support positions.

FIGS. 6A and 6B respectively illustrate these different reactions of the roll-torque transfer formation 33 of FIG. 5A to roll torques and vertical core casing movement. In particular, FIG. 6A illustrates its reaction to a clockwise roll torque and FIG. 6B illustrates its reaction to a downward vertical movement. Directions of motion of the torque links 39a, 39b and the torque beam 45 are denoted by arrows.

In FIG. 6A, the first torque link 39a experiences an upwards vertical load and thereby moves upwardly, while the second torque link 39b experiences a downward vertical load and thereby moves downwardly. Both torque links pivot at their upper and lower ends where they join to respectively the core casing 42 and the ends of the torque beam 45. Upward movement of the outer end of the first half 45a of the beam is reflected in downward movement of its male portion, and downward movement of the outer end of the second half 45b of the beam is reflected in upward movement of its female portion. The male and female portions of the hinge 46 thus engage with and react on each other such that the clockwise roll torque is transferred from the core casing 42 via the torque beam to the lower connection face of the pylon 13b at the support positions of the support bracket 37.

In FIG. 6B, the first 39a and second 39b torque links experience simultaneous vertical movements. The result at the hinge 46 is that both the male and female portions move upwardly, absorbing the downwards vertical movement of the core casing 42 without reacting a load onto the support bracket 37.

Figure 7:
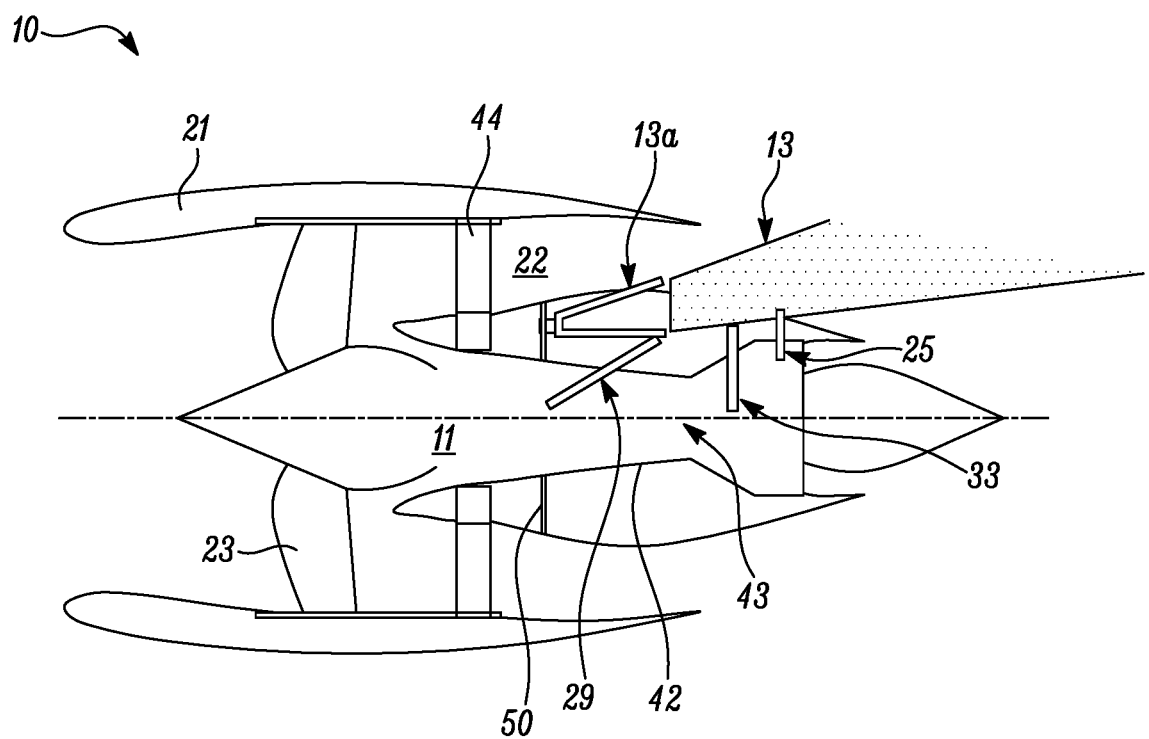
FIG. 7 is a schematic side view of a variant of the support structure.
Figure 8:
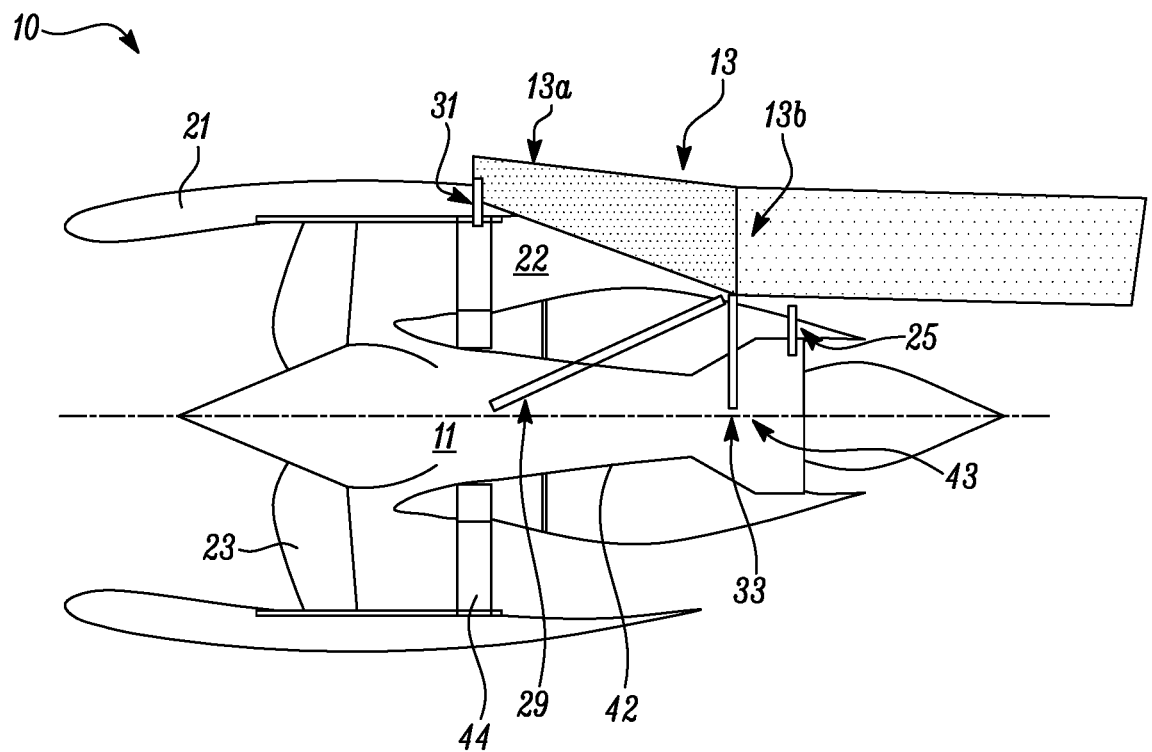
FIG. 8 is a schematic side view of a further variant of the support structure.

FIGS. 7 and 8 are schematic side views of the gas turbine engine 10 showing variants of the support structure 43 of FIG. 4. In particular, in the variant of FIG. 7 the front mount 31 is joined to a bulkhead 50 projecting from the core casing 42 behind the FOGVs 44, e.g. via a monoball connection. This is still a relatively stiff attachment position which does not generate substantial core casing distortions. In addition, instead of sharing a mid attachment position at the lower connection face of the pylon 13, the second ends of the thrust links 29 attach to a first mid attachment position and the roll-torque transfer formation 33 attaches to a second mid attachment position behind the first mid attachment position. In the variant of FIG. 8, the front mount 31 is joined to the engine 10 at the radially outer end of the topmost FOGVs 44. Thus, the forward pylon structure can be contained in a narrow upper bifurcation which extends over the full height of the fan bypass duct 22.

Figure 9:
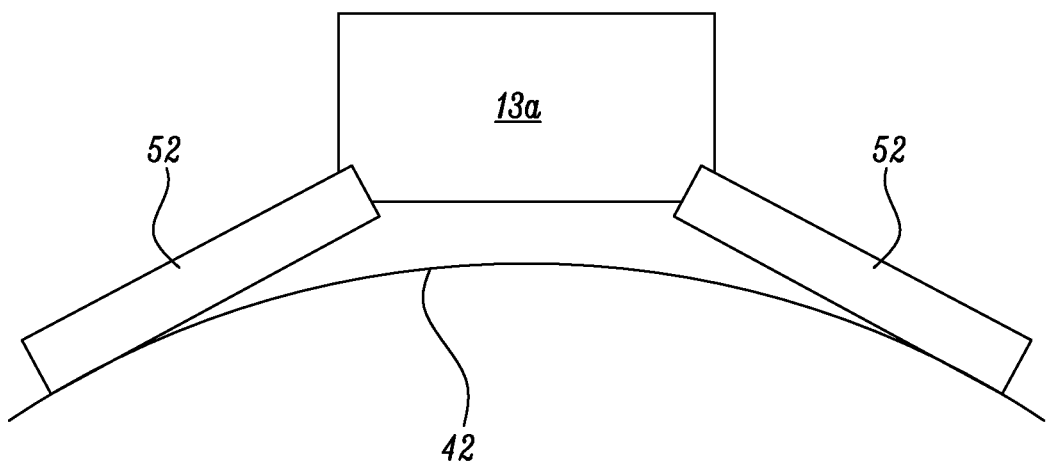
FIG. 9 is a schematic front view of a variant of the support structure of FIG. 8.

FIG. 9 is a schematic front view of a part of the gas turbine engine showing a variant of the support structure 43 of FIG. 8. In the variant of FIG. 9, the front mount 31 is joined to the engine via a twin link arrangement 52. Twin links 52 extend from opposite sides of a swing centre (not shown) coinciding with the centre of the front section 13*a* of the pylon 13 and thus substantially prevent roll torques being reacted into pylon 13. The twin links attach tangentially to the core casing 42 to further reduce core casing distortions. In other variants of the support structure 43, the front section 13*a* is a boxed section with cut-outs for systems routing rather than an open-lattice structure.

Although not illustrated, the support structure 43 may be provided with failsafe features, such as dual elements or waiting failsafe catchers.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example+/−10%.

The invention claimed is:

1. A gas turbine engine including a support structure for attaching the engine to an aircraft pylon at front, mid and rear attachment positions thereof;
   wherein the engine further includes:
   an engine core comprising a turbine, a compressor, and a core shaft connecting the turbine to the compressor; and
   a core casing surrounding the engine core; and
   wherein the support structure includes:
   a front mount joined to the engine and configured to attach to the pylon at the front attachment position and a rear mount joined to the core casing and configured to attach to the pylon at the rear attachment position, each of the front and rear mounts being configured to transfer lateral and vertical loads from the engine to the pylon, and the rear mount being spaced from the front mount such that yaw and pitch torques are also transferred from the engine to the pylon through the front and rear mounts;
   an axial load transfer formation configured to transfer axial loads from the engine to the pylon; and
   a roll-torque transfer formation joined to opposite lateral sides of the core casing and configured to attach to the pylon at the mid attachment position to transfer roll torque from the core casing to the pylon.

2. The gas turbine engine according to claim 1, wherein the roll-torque transfer formation has a first torque link pivotally joined at a lower end thereof to one side of the core casing, a second torque link pivotally joined at a lower end thereof to the other side of the core casing, and a torque beam which extends across the top of the core casing and which is pivotally joined at opposite ends of the beam to respective upper ends of the first and second torque links;
   the roll-torque transfer formation further has a support bracket which is configured to attach to the pylon at the mid attachment position, the support bracket pivotally connecting to the torque beam at two laterally spaced apart support positions between the opposite ends of the beam; and
   a central portion of the torque beam between the support positions forms a hinge joint such that an upward vertical load transmitted through one of the torque links and a simultaneous downward vertical load transmitted through the other torque link are reacted at the support positions to transfer roll torque from the core casing to the pylon, whereas simultaneous movement of both torque links in the same vertical direction hinges the hinge joint to substantially prevent vertical loads being reacted at the support positions.

3. The gas turbine engine according to claim 2, wherein:
   the torque beam has a first half which provides the pivotal joint to the first torque link and the pivotal connection to the support bracket at one of the support positions, and a second half which provides the pivotal joint to the second torque link and the pivotal connection to the support bracket at the other support position; and
   the first half of the torque beam has a male portion that is received in a corresponding female portion of second half of the torque beam to form the hinge joint.

4. The gas turbine engine according to claim 2, wherein:
   the torque beam has a first half which provides the pivotal joint to the first torque link and the pivotal connection to the support bracket at one of the support positions, and a second half which provides the pivotal joint to the second torque link and the pivotal connection to the support bracket at the other support position; and the first half of the torque beam and the second half of the torque beam are pivotally connected to respective ends of a central link to form the hinge joint.

5. The gas turbine engine according to claim 1, wherein the engine further includes a propulsive fan located upstream of the engine core, a bypass duct arranged radially outwardly of the engine core to contain a bypass airflow generated by the fan, and a circumferential row of outlet guide vanes extending across the bypass duct behind the fan.

6. The gas turbine engine according to claim 5, wherein the front mount is joined to the core casing at or behind the outlet guide vanes.

7. The gas turbine engine according to claim 5, wherein the front mount is joined to the engine at a radially outer end of one or more of the outlet guide vanes.

8. The gas turbine engine according to claim 1, wherein the engine further includes a circumferential heat exchange unit surrounding the engine core, and the front mount is joined to the core casing with the front mount locating underneath the heat exchange unit.

9. The gas turbine engine according to claim 1, wherein the front mount is configured so as to substantially prevent roll torque being reacted into the pylon thereat.

10. The gas turbine engine according to claim 1, wherein the axial load transfer formation includes the front mount, which is configured to transfer axial loads from the engine to the pylon.

11. The gas turbine engine according to claim 1, wherein the axial load transfer formation is a pair of thrust links positioned on opposite lateral sides of the engine core, each thrust link having a first end which joins to a respective lateral side of the core casing and each thrust link extending rearwardly, upwardly and inwardly from its first end to a second end which is configured to join to the pylon at a further mid attachment position thereof to transfer axial loads from the engine to the pylon.

12. The gas turbine engine according to claim 11, wherein the further mid attachment position of the pylon for the thrust links coincides with or is in front of the mid attachment position of the pylon for the roll-torque transfer formation.

13. The gas turbine engine according to claim 1, wherein:
the turbine is a first turbine, the compressor is a first compressor, and the core shaft is a first core shaft, and the engine core further comprises a second turbine, a second compressor, and a second core shaft connecting the second turbine to the second compressor; and
the second turbine, the second compressor, and the second core shaft are arranged to rotate at a higher rotational speed than the first core shaft.

14. An aircraft having one or more gas turbine engines including respective support structures according to claim 1, the one or more gas turbine engines being attached to respective pylons of the aircraft by the support structures.

15. The aircraft according to claim 14, wherein the or each pylon has:
a boxed section to transfer roll torque extending between at least the mid attachment position of the roll-torque transfer formation and the rear attachment position; and
a front section having an open-lattice structure extending from the front attachment position to the boxed section.

16. A support structure for attaching an engine to an aircraft pylon at front, mid and rear attachment positions, wherein the support structure includes:
a front mount joined to the engine and configured to attach to the pylon at the front attachment position, and a rear mount joined to an engine core casing and configured to attach to the pylon at the rear attachment position, each of the front and rear mounts being configured to transfer lateral and vertical loads from the engine to the pylon, and the rear mount being spaced from the front mount such that yaw and pitch torques are also transferred from the engine to the pylon through the front and rear mounts;
an axial load transfer formation configured to transfer axial loads from the engine to the pylon; and
a roll-torque transfer formation joined to opposite lateral sides of the engine core casing and configured to attach to the pylon at the mid attachment position to transfer roll torque from the engine core casing to the pylon.

17. The support structure according to claim 16, wherein the roll-torque transfer formation has a first torque link pivotally joined at a lower end thereof to one side of the core casing, a second torque link pivotally joined at a lower end thereof to the other side of the core casing, and a torque beam which extends across the top of the core casing and which is pivotally joined at opposite ends of the beam to respective upper ends of the first and second torque links;
the roll-torque transfer formation further has a support bracket which is configured to attach to the pylon at the mid attachment position, the support bracket pivotally connecting to the torque beam at two laterally spaced apart support positions between the opposite ends of the beam; and
a central portion of the torque beam between the support positions forms a hinge joint such that an upward vertical load transmitted through one of the torque links and a simultaneous downward vertical load transmitted through the other torque link are reacted at the support positions to transfer roll torque from the core casing to the pylon, whereas simultaneous movement of both torque links in the same vertical direction hinges the hinge joint to substantially prevent vertical loads being reacted at the support positions.

18. The support structure according to claim 16, wherein:
the torque beam has a first half which provides the pivotal joint to the first torque link and the pivotal connection to the support bracket at one of the support positions, and a second half which provides the pivotal joint to the second torque link and the pivotal connection to the support bracket at the other support position; and
either the first half of the torque beam has a male portion that is received in a corresponding female portion of second half of the torque beam to form the hinge joint, or
the first half of the torque beam and the second half of the torque beam are pivotally connected to respective ends of a central link to form the hinge joint.

19. The support structure according to claim 16, wherein the axial load transfer formation is a pair of thrust links positioned on opposite lateral sides of the engine core, each thrust link having a first end which joins to a respective lateral side of the core casing and each thrust link extending rearwardly, upwardly and inwardly from its first end to a second end which is configured to join to the pylon at a further mid attachment position thereof to transfer axial loads from the engine to the pylon.

20. The support structure according to claim 19, wherein the further mid attachment position of the pylon for the thrust links coincides with or is in front of the mid attachment position of the pylon for the roll-torque transfer formation.

* * * * *